Sept. 15, 1959 H. A. SIMPSON 2,904,118

CUTTING DEVICE

Filed July 10, 1958 2 Sheets-Sheet 1

INVENTOR
Henry Simpson

BY Bailey, Stephens & Huettig
ATTORNEY

INVENTOR
Henry Simpson

BY Bailey, Stephens, & Huettig
ATTORNEY 2,904,118
Patented Sept. 15, 1959

2,904,118

CUTTING DEVICE

Henry A. Simpson, Geneva, Fla.

Application July 10, 1958, Serial No. 747,615
4 Claims. (Cl. 172—599)

The invention relates to cutting devices, and more particularly to driven cutting devices having gauged cutters. While it is shown as applied to cutting discs such as are used in a disc harrow, it is also applicable in other fields such as multiple sawing devices.

The primary object of the invention is to provide a simple and inexpensive arrangement for the simultaneous driving of a gang of cutters.

An additional object of the invention is to provide a drive for a series of discs on a shaft which is sturdy and effective, which does not damage the shaft and which permits ready replacement of damaged or broken discs.

The invention contemplates a novel arrangement for mounting a series of discs on a common shaft and driving the discs as a unit, providing means separate from the shaft for transmitting motion from each disc to the next, so that the shaft serves merely as a support for the discs and is not subject to the driving torque which revolves the discs.

Further objects and advantages of the invention will appear more fully from the following description, especially when taken in conjunction with the accompanying drawings which form a part thereof.

Figure 1:
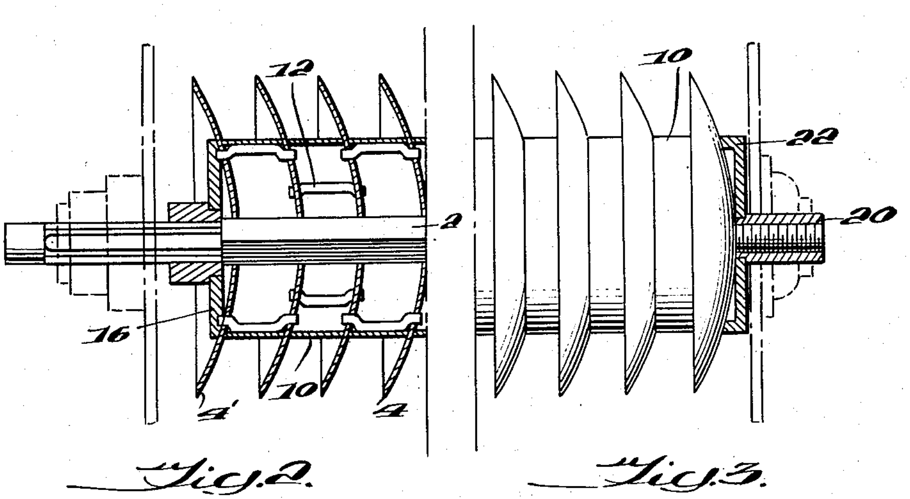
Fig. 1 shows, partly in section, a gang of cutters mounted on a shaft.
Figure 2:
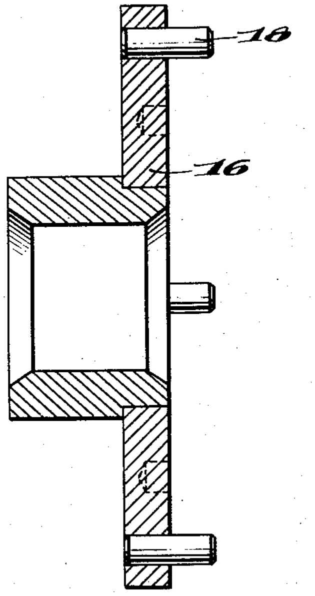
Fig. 2 is a detail section of one of the parts of Fig. 1, taken at an angle of 90° to the plane of Fig. 1.
Figure 3:
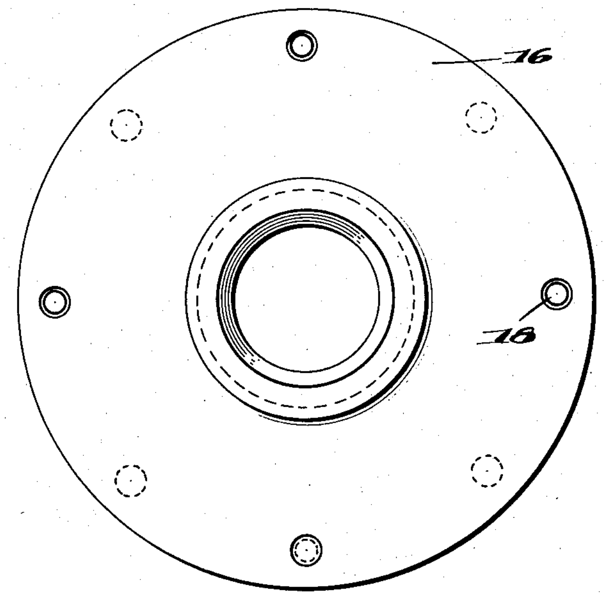
Fig. 3 is a side view of the same part.
Figures 4, 5:
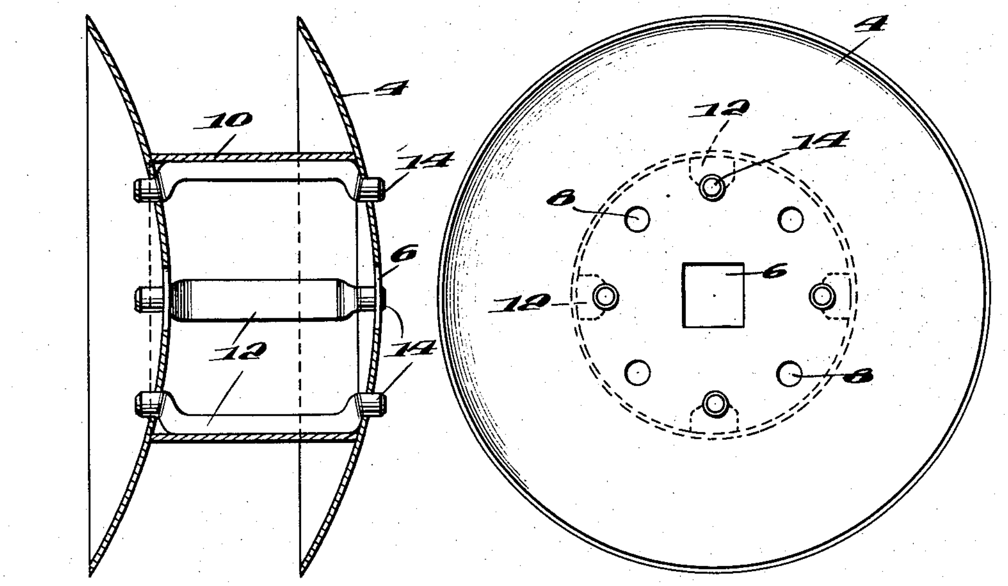
Fig. 4 is an enlarged view of two of the discs of Fig. 1, showing the connecting means.
Fig. 5 is a side view of one of the discs.

Figs. 1 to 5 show one arrangement of discs or cutters on a shaft 2. Each disc or cutter 4 has a central square hole 6 for fitting on the shaft. A series of holes 8 are provided around the disc. Between each pair of discs fits a cylindrical part 10, on the inside of which are welded pin members 12 having inwardly located projections 14 at each end capable of fitting snugly into holes 8. There are half as many pins 2 as holes 8, so that the pins of the next member 10 can fit into the remaining holes of any disc. Pins 12 preferably have flat sides fitting against member 10 so as to be more firmly secured to it. Because pins 12 are inside member 10, they are protected from dust and dirt and from injury.

Fixed on shaft 2 is a disc 16 having pins 18 engageable in the holes of the inboard disc 4'. A nut 20 threaded on the outer end of shaft 2 engages a plate 22 which rests against the outer disc, but is turnable on the shaft.

Thus the drive for the cutters 4 from shaft 2 is through disc 16 from the shaft and then from each cutter to the next through pins 12.

Such a unit may be used in machines with driven discs for cultivating the ground and cutting up grass and underbrush.

Figure 6:
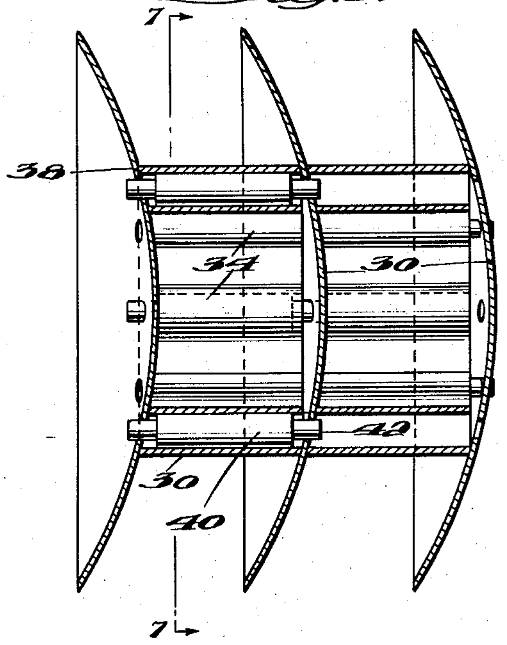
Fig. 6 shows, in cross-section, another form of connection between the cutters.
Figure 7:
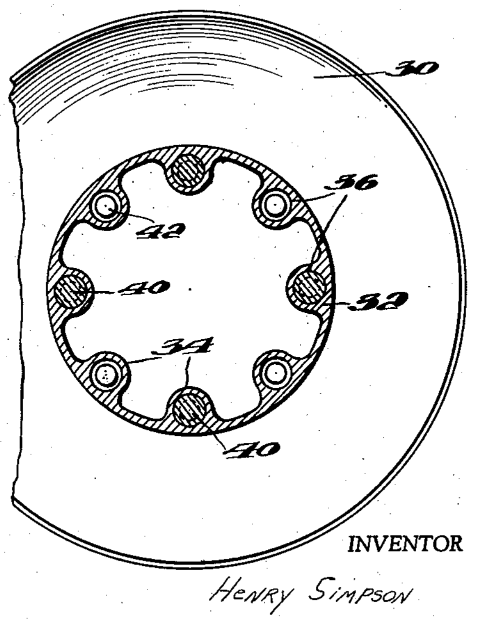
Fig. 7 is a side view of the spacer and pins of Fig. 6.

In the form of Figs. 6 and 7, cutters or discs 30 of concave shape are spaced apart by annular spacers 32 each of which has on its inner wall a plurality of projections 34 having bores 36 parallel to the spacer axis. The spacers 32 also have an inwardly sloped edge 38 engaging the convex faces of the cutters 32.

Each disc has a plurality of holes 40 opposite bores 36, but of smaller diameter. Pins 42 having reduced ends 44 are arranged in alternate bores of each spacer and their reduced ends fit in the holes in the discs. Thus drive is transmitted from each disc to the next.

While I have described herein some embodiments of my invention, I wish it to be understood that I do not intend to limit myself thereby except within the scope of the claims hereto or hereinafter appended.

I claim:

1. In combination with a driven shaft, a plurality of circular cutter members, a disc mounted on said shaft for rotation therewith spaced from said cutter members, said disc and each of said cutter members having a plurality of holes therein spaced from the centers thereof and angularly spaced therearound, said cutter members being arranged side by side in spaced relation with their centers in the line of the axis of the shaft, annular spacers between each adjacent pair of cutter members, pins carried by each of the spacers, said pins including pins extending across the space from one cutter member to the adjacent cutter member and engaging in alternate holes of both such cutter members and pins extending across the space from the disc to the cutter member adjacent thereto and engaging in the holes both of the disc and of the cutter member, and means connected to the shaft engaging the outer cutter member for drawing the cutter members towards the discs, said disc forming the sole driving connection between the cutter members and the shaft.

2. In a device as claimed in claim 1, said spacers being in the form of hollow rings and said pins being located inside the hollow spaces of the rings.

3. In a device as claimed in claim 2, said pins being welded to the spacers.

4. In a device as claimed in claim 1, said cutter members being concave, and said spacers having sloping edges engaging the convex faces of the cutter members.

References Cited in the file of this patent

UNITED STATES PATENTS

| | | |
|---|---|---|
| 1,996,676 | Hargrave | Apr. 2, 1935 |
| 2,702,974 | Wiesenthal | Mar. 1, 1955 |

FOREIGN PATENTS

| | | |
|---|---|---|
| 684,202 | Great Britain | Dec. 10, 1952 |